US012612805B2

(12) United States Patent
Choudhary et al.

(10) Patent No.: US 12,612,805 B2
(45) Date of Patent: Apr. 28, 2026

(54) TUBULAR LATCH MECHANISM

(71) Applicant: Schlage Lock Company LLC, Carmel, IN (US)

(72) Inventors: Hariom Choudhary, Samastipur (IN); Anjan Srinivas, Tumkur (IN); Allen Mani, Thrissur (IN); David J. Hurlbert, Manitou Springs, CO (US)

(73) Assignee: Schlage Lock Company LLC, Carmel, IN (US)

( * ) Notice: Subject to any disclaimer, the term of this patent is extended or adjusted under 35 U.S.C. 154(b) by 112 days.

(21) Appl. No.: 18/584,495

(22) Filed: Feb. 22, 2024

(65) Prior Publication Data

US 2025/0270852 A1 Aug. 28, 2025

(51) Int. Cl.

| | |
|---|---|
| ***E05B 63/06*** | (2006.01) |
| ***E05B 15/00*** | (2006.01) |
| ***E05B 55/12*** | (2006.01) |
| ***E05C 1/08*** | (2006.01) |
| ***E05C 1/12*** | (2006.01) |
| ***E05C 1/16*** | (2006.01) |

(52) U.S. Cl.
CPC .......... *E05B 63/06* (2013.01); *E05B 15/0053* (2013.01); *E05B 55/12* (2013.01); *E05C 1/08* (2013.01); *E05C 1/12* (2013.01); *E05C 1/163* (2013.01)

(58) Field of Classification Search
CPC ..... E05C 1/00; E05C 1/12; E05C 1/16; E05C 1/163; E05C 1/08; E05B 15/0053; E05B 55/12; E05B 63/06; Y10T 292/06; Y10T 292/0977; Y10T 292/1016; Y10T 292/098
See application file for complete search history.

(56) References Cited

U.S. PATENT DOCUMENTS

| | | | | |
|---|---|---|---|---|
| 4,656,849 | A | 4/1987 | Rotondi et al. | |
| 5,257,838 | A * | 11/1993 | Lin | E05B 63/06 292/1.5 |
| 5,743,573 | A | 4/1998 | Huang | |
| 6,030,008 | A | 2/2000 | Chang | |
| 6,536,812 | B1 | 3/2003 | Winardi | |
| 6,688,660 | B2 | 2/2004 | Huang | |
| 6,736,432 | B2 | 5/2004 | Huang et al. | |
| 7,717,480 | B2 | 5/2010 | Fan | |

(Continued)

OTHER PUBLICATIONS

International Search Report; ISA/US; International Application No. PCT/US2025/017027; Aug. 15, 2025; 3 pages.

(Continued)

*Primary Examiner* — Christine M Mills
*Assistant Examiner* — Peter H Watson
(74) *Attorney, Agent, or Firm* — Taft Stettinius & Hollister LLP

(57) ABSTRACT

Certain embodiments of the present disclosure relate to a latch mechanism, including a housing assembly, a bolt bar, a bolt, and a multiplier. The bolt bar is slidably mounted in the housing assembly, the bolt is slidably mounted in the housing assembly, and the multiplier is pivotably mounted to the bolt bar. The multiplier is configured to move the bolt by a first displacement distance in response to movement of the bolt bar by a second displacement distance, and the first displacement distance is greater than the second displacement distance.

21 Claims, 9 Drawing Sheets

(56) References Cited

U.S. PATENT DOCUMENTS

| | | | | |
|---|---|---|---|---|
| 8,727,396 | B2 | 5/2014 | Bui | |
| 10,513,872 | B2 | 12/2019 | Kumar | |
| 2003/0230903 | A1 * | 12/2003 | Huang | E05C 1/163 292/337 |
| 2004/0130162 | A1 * | 7/2004 | Don | E05B 63/06 292/1.5 |
| 2004/0212199 | A1 | 10/2004 | Huang | |
| 2018/0195312 | A1 * | 7/2018 | Chen | E05B 1/0053 |
| 2021/0222465 | A1 | 7/2021 | Cheng | |

OTHER PUBLICATIONS

Written Opinion of the International Searching Authority; ISA/US; International Application No. PCT/US2025/017027; Aug. 15, 2025; 7 pages.

* cited by examiner

TUBULAR LATCH MECHANISM

TECHNICAL FIELD

The present disclosure generally relates to latch mechanisms, and more particularly but not exclusively relates to latch mechanisms for tubular locksets.

BACKGROUND

Latch mechanisms are commonly used in locksets to aid in retaining a door in a closed position. However, certain existing latch mechanisms suffer from one or more drawbacks and/or limitations, such as those related to consistently retracting the latchbolt in different backset settings. For these reasons among others, there remains a need for further improvements in this technological field.

SUMMARY

Certain embodiments of the present disclosure relate to a latch mechanism, including a housing assembly, a bolt bar, a bolt, and a multiplier. The bolt bar is slidably mounted in the housing assembly, the bolt is slidably mounted in the housing assembly, and the multiplier is pivotably mounted to the bolt bar. The multiplier is configured to move the bolt by a first displacement distance in response to movement of the bolt bar by a second displacement distance, and the first displacement distance is greater than the second displacement distance. Further embodiments, forms, features, and aspects of the present application shall become apparent from the description and figures provided herewith.

DETAILED DESCRIPTION OF ILLUSTRATIVE EMBODIMENTS

Figure 1:
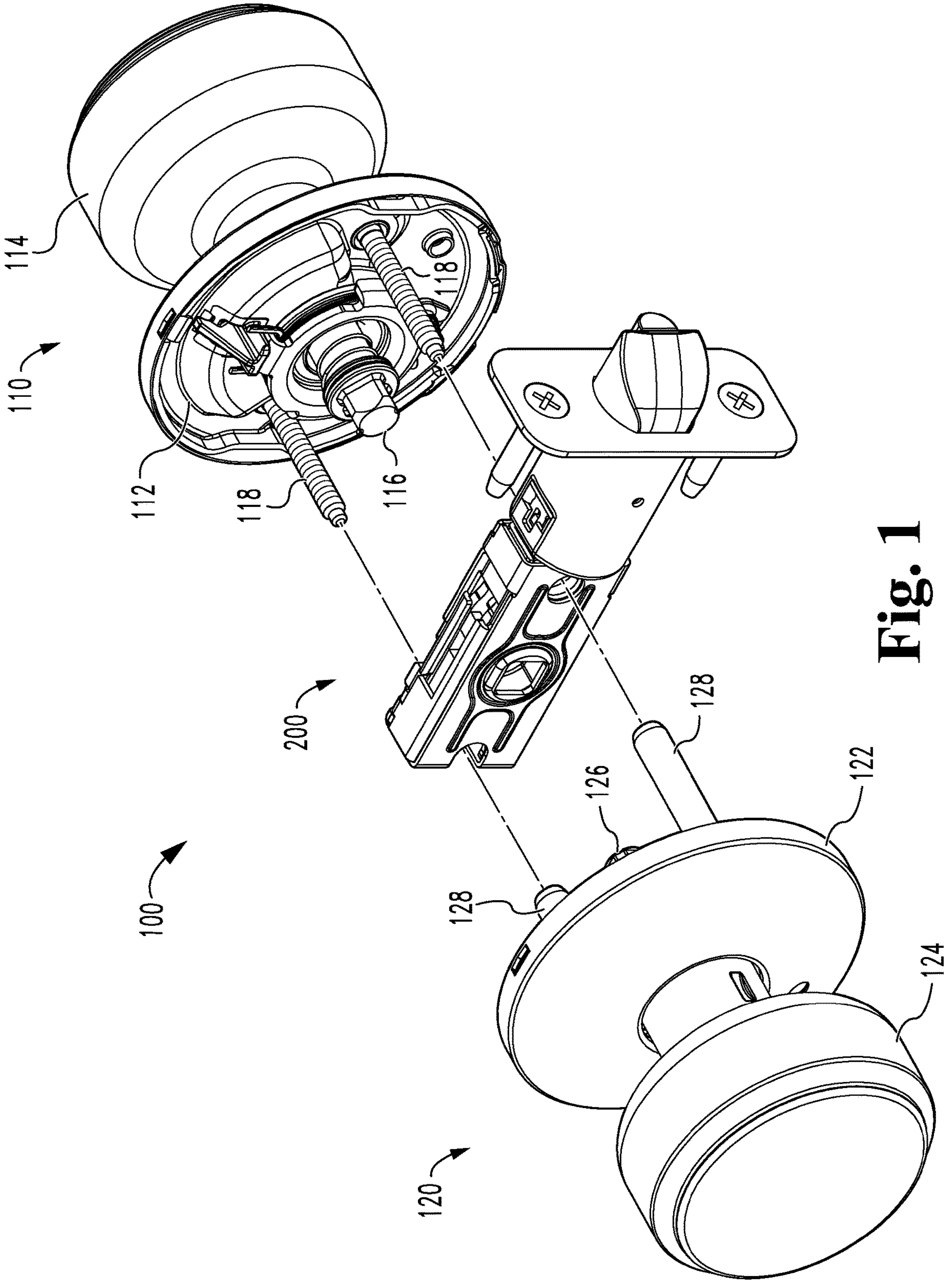
FIG. 1 is an exploded assembly view of a lockset according to certain embodiments.

Although the concepts of the present disclosure are susceptible to various modifications and alternative forms, specific embodiments have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. It should further be appreciated that although reference to a "preferred" component or feature may indicate the desirability of a particular component or feature with respect to an embodiment, the disclosure is not so limiting with respect to other embodiments, which may omit such a component or feature. Further, when a particular feature, structure, or characteristic is described in connection with an embodiment, it is submitted that it is within the knowledge of one skilled in the art to implement such feature, structure, or characteristic in connection with other embodiments whether or not explicitly described.

Additionally, it should be appreciated that items included in a list in the form of "at least one of A, B, and C" can mean (A); (B); (C); (A and B); (B and C); (A and C); or (A, B, and C). Similarly, items listed in the form of "at least one of A, B, or C" can mean (A); (B); (C); (A and B); (B and C); (A and C); or (A, B, and C). Items listed in the form of "A, B, and/or C" can also mean (A); (B); (C); (A and B); (B and C); (A and C); or (A, B, and C). Further, with respect to the claims, the use of words and phrases such as "a," "an," "at least one," and/or "at least one portion" should not be interpreted so as to be limiting to only one such element unless specifically stated to the contrary, and the use of phrases such as "at least a portion" and/or "a portion" should be interpreted as encompassing both embodiments including only a portion of such element and embodiments including the entirety of such element unless specifically stated to the contrary.

In the drawings, some structural or method features may be shown in certain specific arrangements and/or orderings. However, it should be appreciated that such specific arrangements and/or orderings may not necessarily be required. Rather, in some embodiments, such features may be arranged in a different manner and/or order than shown in the illustrative figures unless indicated to the contrary. Additionally, the inclusion of a structural or method feature in a particular figure is not meant to imply that such feature is required in all embodiments and, in some embodiments, may be omitted or may be combined with other features.

With reference to FIG. 1, illustrated therein is a lockset 100 according to certain embodiments. The lockset 100 generally includes an inside assembly 110 configured for mounting to an egress side of a door, an outside assembly 120 configured for mounting to a non-egress side of the door, and a latch mechanism 200 according to certain embodiments. As described herein, the latch mechanism 200 is engaged with each of the inside assembly 110 and the outside assembly 120 such that each of the inside assembly 110 and the outside assembly 120 is at least selectively operable to actuate the latch mechanism 200.

The inside assembly 110 is configured for mounting to the egress side of a door, and generally includes an inside housing 112, an inside handle 114 rotatably mounted to the housing 112, and an inside spindle 116 rotationally coupled with the handle 114. In the illustrated form, the handle 114 is provided in the form of a knob. It is also contemplated that the handle 114 may be provided in another form, such as that of a lever. The handle 114 is at least selectively operable to rotate the spindle 116 for actuation of the latch mechanism 200. As described herein, the inside assembly 110 further includes a pair of inside mounting posts 118 that facilitate coupling of the inside assembly 110 with the outside assembly 120.

The outside assembly 120 is configured for mounting to the non-egress side of the door, and generally includes an outside housing 122, an outside handle 124 rotatably mounted to the housing 122, and an outside spindle 126 rotationally coupled with the handle 124. In the illustrated form, the handle 124 is provided in the form of a knob. It is also contemplated that the handle 124 may be provided in another form, such as that of a lever. The handle 124 is at least selectively operable to rotate the spindle 126 for actuation of the latch mechanism 200. As described herein, the outside assembly 120 further includes a pair of outside mounting posts 128 that engage the inside mounting posts 118 to facilitate coupling of the inside assembly 110 with the outside assembly 120.

As noted above, each of the inside assembly 110 and the outside assembly 120 includes a corresponding pair of mounting posts 118, 128 that facilitate coupling of the inside and outside assemblies 110, 120. While other forms are contemplated, in the illustrated form, the mounting posts 118, 128 are provided in the form of mating sex bolts. For example, the inside mounting posts 118 may be provided in the form of male bolts, and the outside mounting posts 128 may be provided in the form of female bolts configured to matingly receive the male bolts. As described herein, at least one of the mounting posts 118, 128 extends through apertures in the latch mechanism 200 to discourage or prevent lateral shifting of the latch mechanism 200 relative to the inside assembly 110 and the outside assembly 120.

Figure 2:
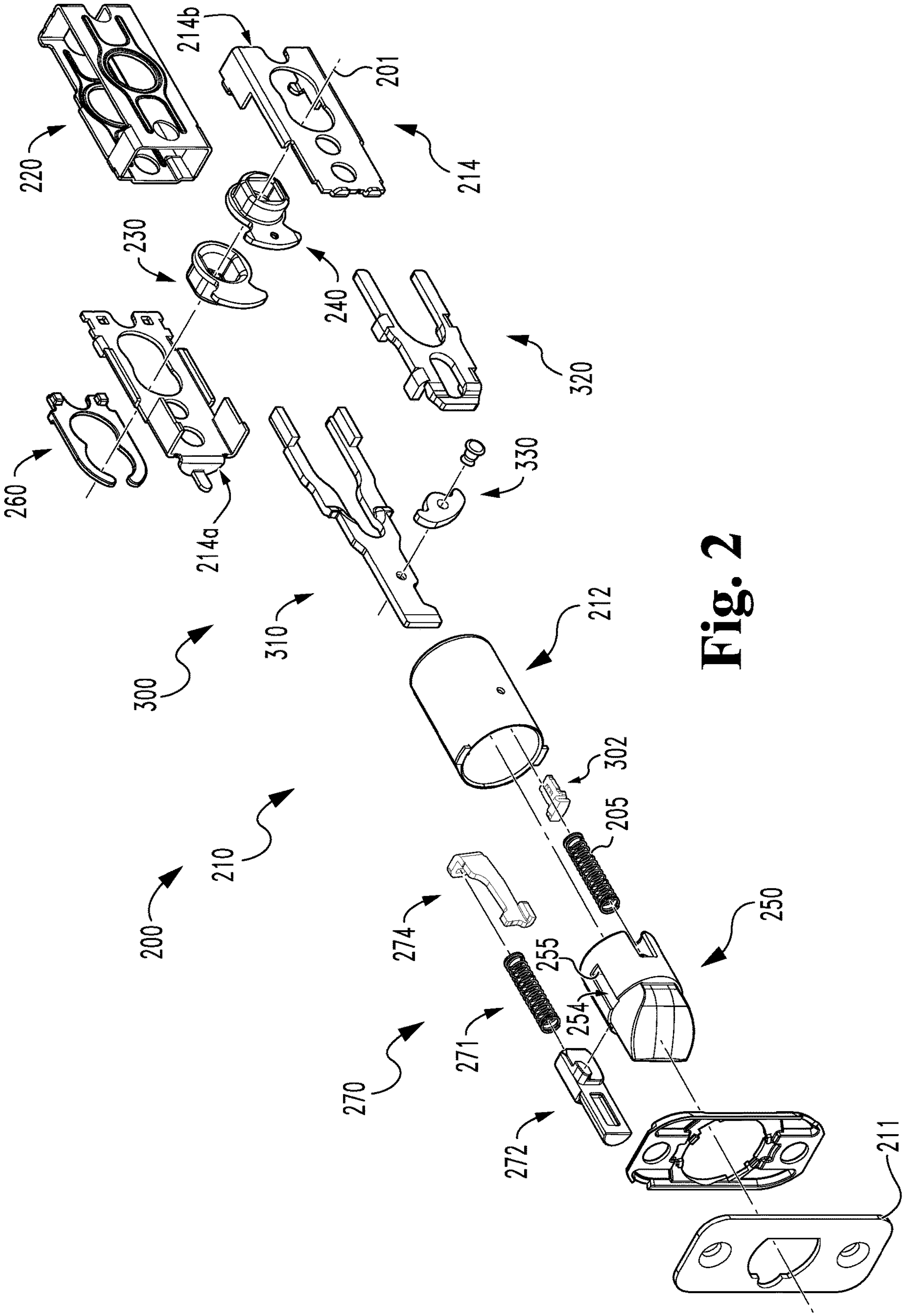
FIG. 2 is an exploded assembly view of a latch mechanism according to certain embodiments.

With additional reference to FIG. 2, the illustrated latch mechanism 200 generally includes a housing assembly 210, a backset adjustment sleeve 220 slidably mounted to the housing assembly 210, a pair of cams 230, 240 rotatably mounted within the housing assembly 210, a bolt 250 slidably mounted in the housing assembly 210, and a retraction assembly 300 configured to retract the bolt 250 in response to rotation of each and either of the cams 230, 240. In certain forms, the latch mechanism 200 may include a cam holder 260 operable to selectively retain the latch mechanism 200 in a desired backset setting, and/or a deadlatch mechanism 270 operable to selectively prevent an externally-applied pushing force from depressing the bolt 250 to its retracted position. As described herein, the cams 230, 240 are mounted to the backset adjustment sleeve 220 for rotation about a rotational axis 201, and the backset adjustment sleeve 220 is slidable relative to the housing assembly 210 to facilitate shifting of the rotational axis 201 relative to the housing assembly 210.

Figure 3:
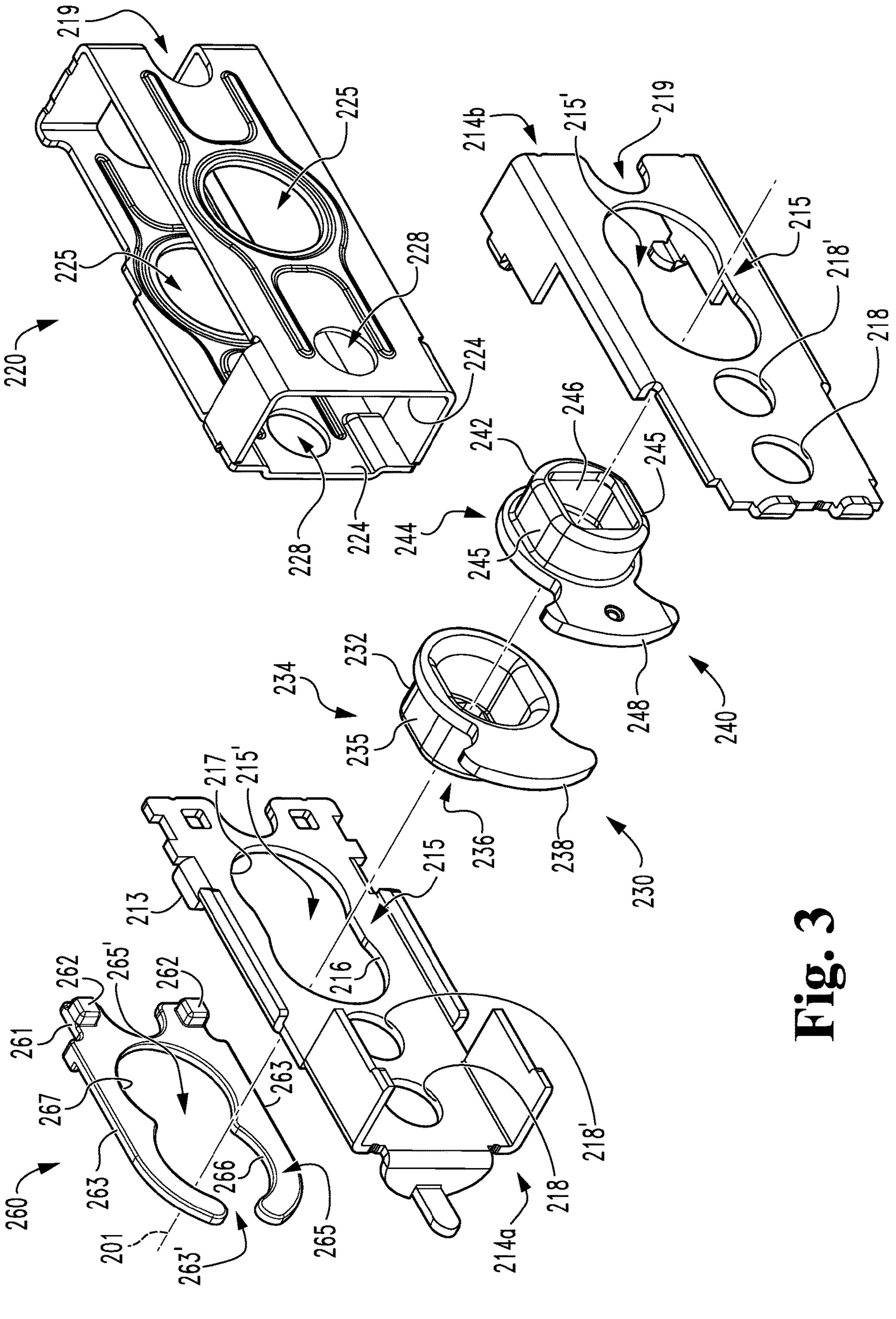
FIG. 3 is an exploded assembly view of a portion of the latch mechanism.

With additional reference to FIG. 3, the housing assembly 210 generally includes a tubular front housing 212 and a generally box-shaped rear housing 214, and may further include a faceplate 211 mounted to the front housing 212. The rear housing 214 includes a first housing component **214*a* and a second housing component 214*b*, each of which includes a cam aperture 215, a first mounting post aperture 218, and a second mounting post aperture 218'. In certain forms, the rear housing 214 may further include a recess 219 that cooperates with the first mounting post aperture 218 to facilitate the passage of the mounting posts 118, 128 through the latch mechanism 200. Each cam aperture 215 of the housing assembly 210 includes a first housing seat 216 that rotatably receives a corresponding cam 230, 240 when the latch mechanism 200 is in a first backset setting (FIG. 4), and a second housing seat 217 that rotatably receives a corresponding cam 230, 240 when the latch mechanism 200 is in a second backset setting (FIG. 5). The first housing seat 216 and the second housing seat 217 are open to one another via a passage 215' that permits sliding of the cams 230, 240 between the first seat 216 and the second seat 217**.

Figure 4:
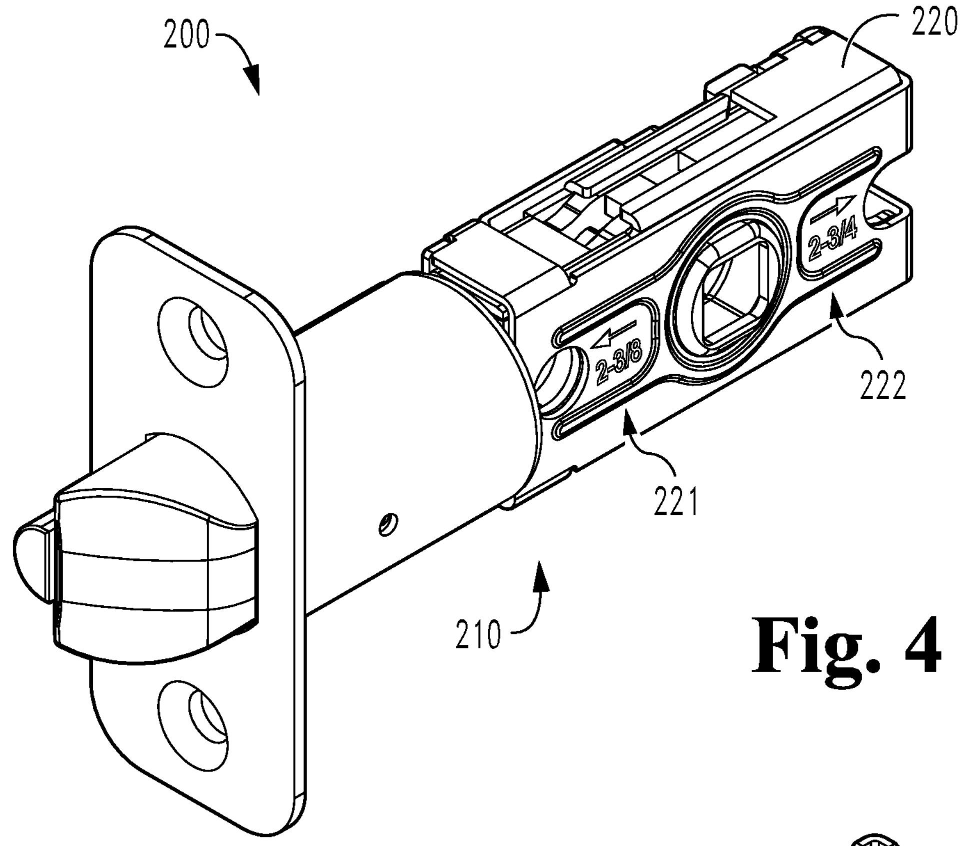
FIG. 4 is a perspective illustration of the latch mechanism in a first backset setting.
Figure 5:
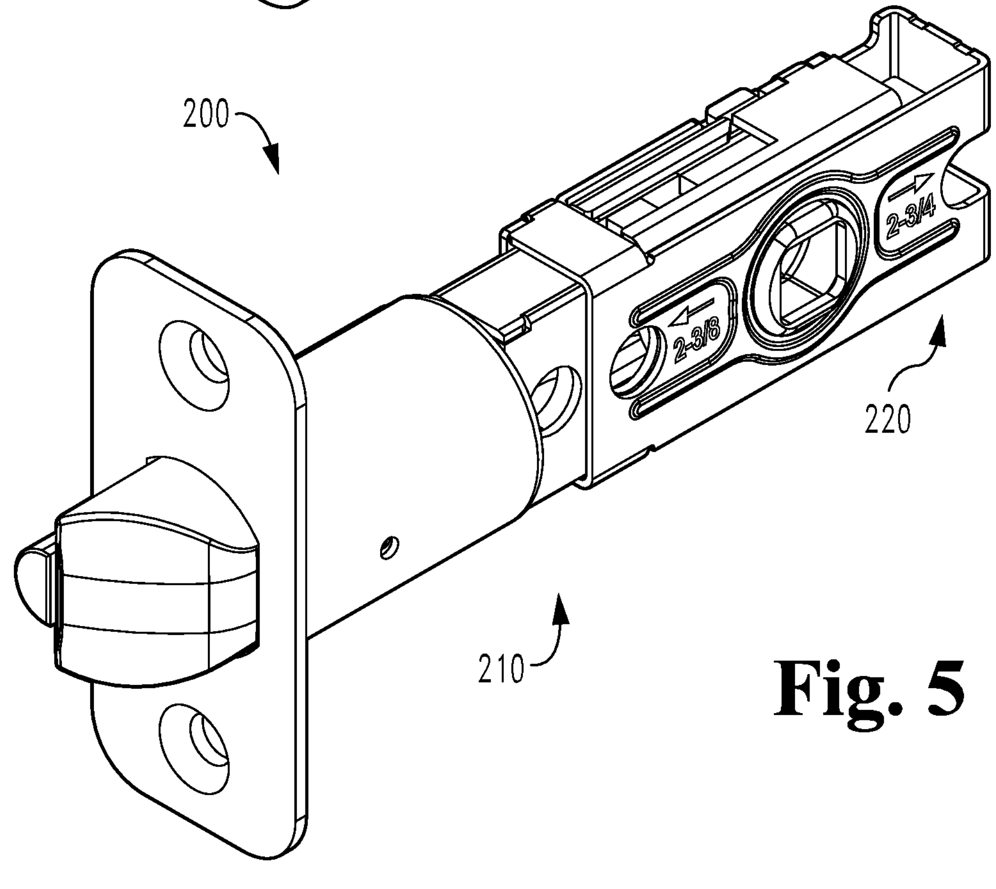
FIG. 5 is a perspective illustration of the latch mechanism in a second backset setting.

With additional reference to FIGS. 4 and 5, the backset adjustment sleeve 220 is slidably mounted to the rear housing 214 for movement between a forward position and a rearward position to transition the latch mechanism 200 between a first backset setting (FIG. 4) and a second backset setting (FIG. 5). With the backset adjustment sleeve 220 in the forward position (FIG. 4), the backset for the latch mechanism is a first backset distance, such as 2⅜ inches (about 60 mm). With the backset adjustment sleeve 220 in the rearward position (FIG. 5), the backset for the latch mechanism 200 is a second backset distance, such as 2¾ inches (about 70 mm). As will be appreciated, the backset distance may be measured from the faceplate 211 (or the front of the front housing 212) to the rotational axis 201 about which the cams 230, 240 rotate. In certain forms, the backset adjustment sleeve 220 may include indicia that facilitate the adjustment of the latch mechanism 200 between the first backset setting and the second backset setting. For example, the illustrated backset adjustment sleeve 220 includes first indicia 221 indicating that the backset adjustment sleeve 220 can be moved in a first direction (e.g., forward) to obtain the first backset setting, and second indicia 222 indicating that the backset adjustment sleeve 220 can be moved in an opposite second direction (e.g., rearward) to obtain the second backset setting.

The backset adjustment sleeve 220 generally includes a pair of spaced-apart walls 224, and each wall 224 defines a cam aperture 225, a mounting post aperture 228, and a recess 229. Each cam aperture 225 is generally circular, and rotatably supports a corresponding one of the cams 230, 240. With the backset adjustment sleeve 220 in its forward position, the cam apertures 225 are aligned with the first housing seats 216, the mounting post aperture 228 is aligned with the first mounting post aperture 218, and the recess 229 is aligned with the recess 219. As a result, the cams 230, 240 are rotatably received in the first seats 216, one pair of mounting posts 118, 128 is operable to pass through the latch mechanism 200 via the mounting post apertures 218, 228, and the other pair of mounting posts 118, 128 is operable to extend through the recesses 219, 229. With the backset adjustment sleeve 220 in its rearward position, the cam apertures 225 are aligned with the second seats 217, and the mounting post aperture 228 is aligned with the second mounting post aperture 218'. As a result, the cams 230, 240 are rotatably received in the second seats 217, and one pair of engaged mounting posts 118, 128 is operable to pass through the latch mechanism 200 via the mounting post apertures 218, 228'.

The first cam 230 is rotatably received in a first of the housing cam apertures 215 and a corresponding one of the backset adjustment sleeve cam apertures 225, and generally includes a boss 232 and an actuating portion 238 extending outward from the boss 232. The boss 232 has a generally circular outer profile to facilitate the rotation of the cam 230 within the seats 216, 217, and is provided with a narrowed section 234 defined by a pair of flats 235. When the first cam 230 is in its home position, the narrowed section 234 is aligned with the passage 215' such that the first cam 230 is operable to travel between the first seat 216 and the second seat 217, for example during shifting of the backset adjustment sleeve 220 between its forward and rearward positions. The boss 232 may include a spindle opening 236 sized and shaped to matingly receive an end portion of one of the spindles 116, 126 for rotational coupling of the first cam 230 with the corresponding one of the handles 114, 124.

The second cam 240 is substantially similar to the first cam 230. The second cam 240 is rotatably received in a second of the housing cam apertures 215 and a corresponding one of the backset adjustment sleeve cam apertures 225, and generally includes a boss 242 and an actuating portion 248 extending outward from the boss 242. The boss 242 has a generally circular outer profile to facilitate the rotation of the cam 240 within the seats 216, 217, and is provided with a narrowed section 244 defined by a pair of flats 245. When the second cam 240 is in its home position, the narrowed section 244 is aligned with the passage 215' such that the second cam 240 is operable to travel between the first seat 216 and the second seat 217, for example during shifting of the backset adjustment sleeve 220 between its forward and rearward positions. The boss 242 may include a spindle opening 246 sized and shaped to matingly receive an end portion of one of the spindles 116, 126 for rotational coupling of the second cam 240 with the corresponding one of the handles 114, 124.

The bolt 250 is slidably received in the front housing 212 for movement between a projected position and a retracted position, and may be biased toward the projected position, for example by a spring 205. As described herein, the bolt 250 is engaged with the retraction assembly 300 such that the bolt 250 moves from its projected position to its retracted position in response to rotation of each and either of the cams 230, 240 from the home position thereof to the actuated position thereof.

The cam holder 260 is mounted to the rear housing 214, and generally includes a base portion 261 and a pair of arms 263 extending away from the base portion 261 such that a recess 265 is defined between the arms 263. In the illustrated form, the base portion 261 includes a pair of protrusions 262 that engage corresponding apertures formed in the rear housing 214, and the arms 263 are cantilevered such that a gap 263' is formed between the tips of the arms 263, which are opposite the base portion 261. The recess 265 is aligned with the cam aperture 215, and receives the boss 232 of the first cam 230. The recess 265 generally includes a first cam holder seat 266 aligned with the first housing seat 216, and a second cam holder seat 267 aligned with the second housing seat 217. The recess 265 is also partially defined by a pair of projections that define a constriction 265' of the recess 265. The recess 265 is generally in the shape of a Venn diagram, in which two circles corresponding to the two seats 266, 267 intersect.

The cam holder 260 is formed of a resilient material configured to permit some flexing of the arms 263 away from one another. The cam holder 260 has a natural or undeformed state, to which it is biased by the resiliency of the material, and a deformed state in which the arms 263 are flexed away from one another. When the cam holder 260 is in its natural state and the cam 230 is engaged with a particular one of the seats 266, 267, the constriction 265' resists movement of the cam 230 from the particular one of the seats 266, 267 to the other of the seats 266, 267. When a sufficient pushing force is applied to the cam 230 (e.g., by the backset adjustment sleeve 220), the arms 263 flex away from one another to thereby permit the cam 230 to travel between the first seat 266 and the second seat 267. As the cam 230 moves from one seat to the other seat, the arms 263 return to their natural positions. This flexing of the arms 263 provides tactile feedback and informs the user that the shifting is occurring. In certain forms, the rear housing 214 may include one or more stops 213 that limit flexing of the arms 263.

Figure 6:
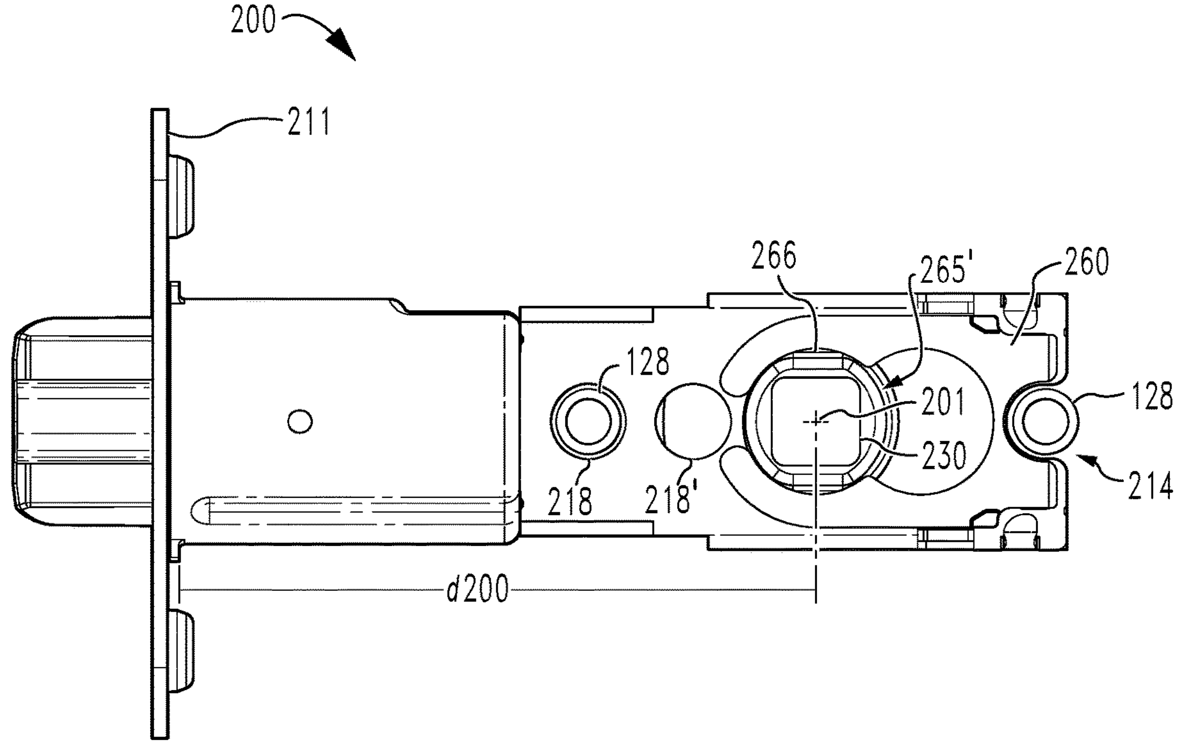
FIG. 6 is a plan view of the latch mechanism in the first backset setting.
Figure 7:
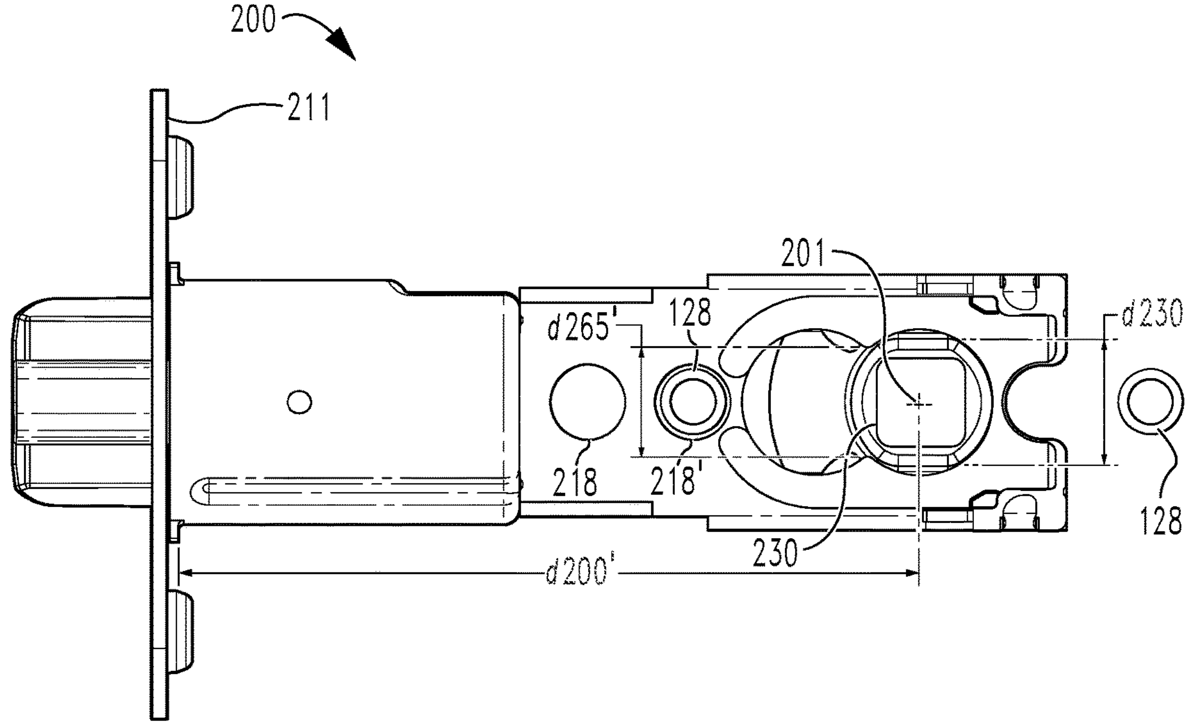
FIG. 7 is a plan view of the latch mechanism in the second backset setting.

With additional reference to FIGS. 6 and 7, illustrated therein is the latch mechanism 200 in the first backset setting (FIG. 6) and the second backset setting (FIG. 7). In the interest of clarity, the backset adjustment sleeve 220 is omitted from the illustrations of FIGS. 6 and 7. When the latch mechanism 200 is in the first backset setting (FIGS. 4 and 6), the backset adjustment sleeve 220 is in its forward position, thereby placing the cam 230 in the first seats 216, 266 and providing the latch mechanism 200 with a first backset distance d200 (e.g., 2⅜ inches or 60 mm). When the latch mechanism 200 is in the second backset setting (FIGS. 5 and 7), the backset adjustment sleeve 220 is in its rearward position, thereby placing the cam 230 in the second seats 217, 267 and providing the latch mechanism 200 with a second backset distance d200' (e.g., 2¾ inches or 70 mm).

Also illustrated in FIGS. 6 and 7 are the mounting posts 128. When the latch mechanism 200 is in its first backset setting (FIG. 6), one mounting post 128 extends through the first mounting post aperture 218, and the other mounting post 128 is seated in the recess 219. When the latch mechanism 200 is in its second backset setting (FIG. 7), one mounting post 128 extends through the second mounting post aperture 218', and the other mounting post 128 is positioned rearward of the recess 219. As will be appreciated, the mounting posts 128 may need to be removed from the apertures 218, 218' prior to shifting the latch mechanism 200 between the first backset setting and the second backset setting.

As should be evident from the foregoing, the first seat 266 is configured to selectively retain the first cam 230 in the first backset position, the second seat 267 is configured to selectively retain the first cam 230 in the second backset position, and the constriction 265' is configured to discourage shifting of the cam 230 between its first backset position and its second backset position. In the illustrated form, the dimension d265' of the constriction 265' is less than the diameter d230 of the boss 232 of the cam 230. As a result, the arms 263 must flex away from one another to permit shifting of the cam 230 between its first backset position and its second backset position. As noted above, the stops 213 may aid in limiting this flexing.

The deadlatch mechanism 270 generally includes a plunger 272 that is biased toward a projected position, for example by a deadlatch spring 271, and a pivot plate 274 that is pivotably mounted in the front housing 212 for movement between a blocking position and a non-blocking position. The plunger 272 is engaged with the pivot plate 274 such that the pivot plate 274 adopts the blocking position when the plunger 272 is projected, and adopts the non-blocking position when the plunger 272 is depressed. When the pivot plate 274 is in the blocking position, the deadlatch mechanism 270 prevents external pushing forces from driving the bolt 250 to its retracted position, thereby deadlocking the latch mechanism 200.

The retraction assembly 300 generally includes a primary bolt bar 310 slidably mounted in the housing assembly 210, a secondary bolt bar 320 slidably mounted in the housing assembly 210, and a multiplier 330 pivotably mounted to the primary bolt bar 310 and operable to engage each of the bolt 250 and a fulcrum plate 302, which is mounted in the front housing 212. As described herein, retraction of the primary bolt bar 310 by a first retraction distance causes the bolt 250 to retract by a second retraction distance greater than the first retraction distance.

Figure 8:
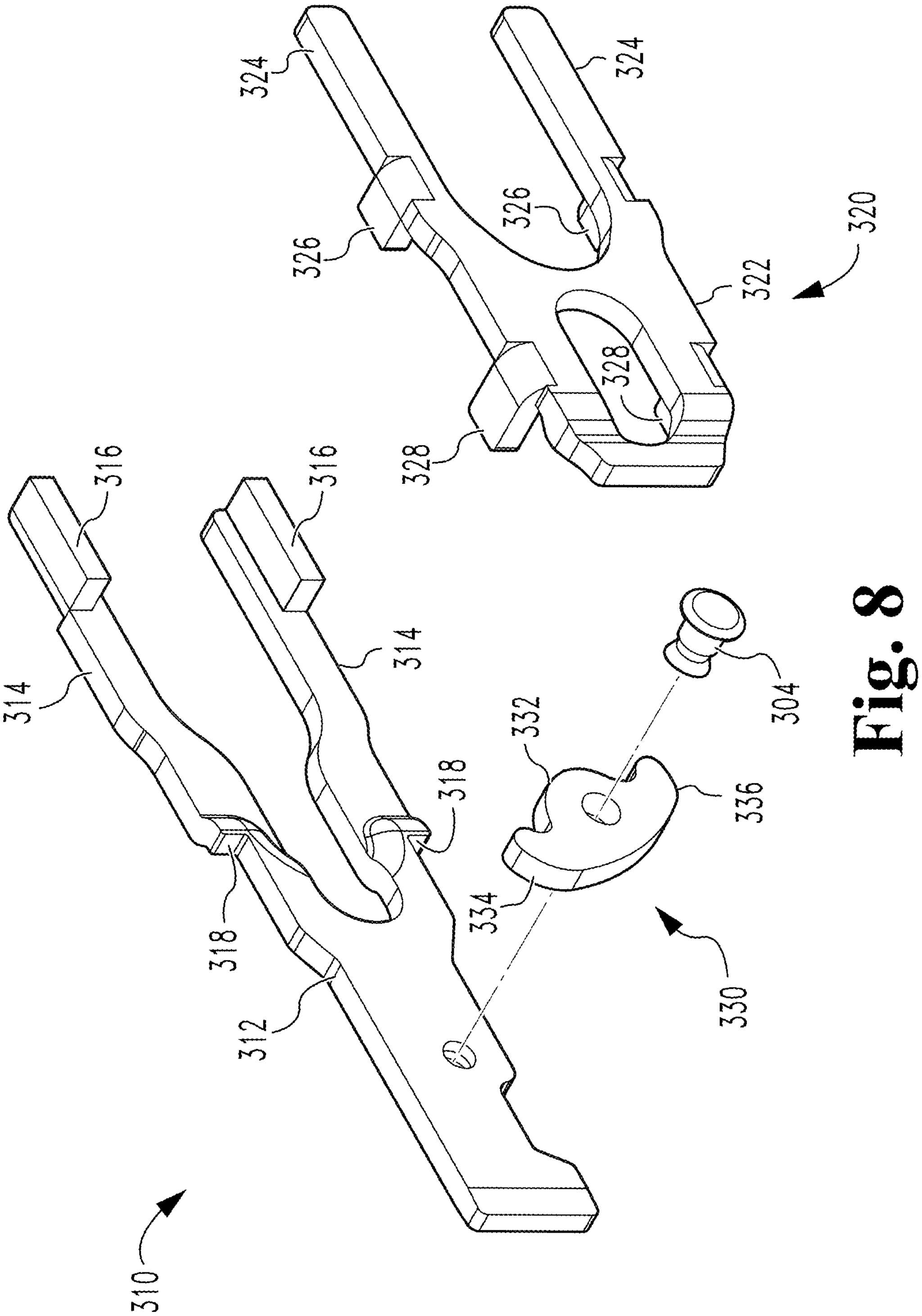
FIG. 8 is an exploded assembly view of a portion of the latch mechanism.

With additional reference to FIG. 8, the primary bolt bar 310 includes a body portion 312 and a pair of arms 314 extending rearward from the body portion 312. Each of the arms 314 includes an engagement flange 316 and a shoulder 318. When the latch mechanism 200 is in its second backset setting, each of the cams 230, 240 is operable to engage each of the flanges 316 to thereby retract the primary bolt bar 310. More particularly, rotation of either cam 230, 240 in a first direction causes the actuating portion 238, 248 of the cam 230, 240 to engage a first of the flanges 316 for retraction of the bolt bar 310, and rotation of either cam 230, 240 in an opposite second direction causes the actuating portion 238, 248 of the cam 230, 240 to engage a second of the flanges 316 for retraction of the bolt bar 310.

The secondary bolt bar 320 also includes a body portion 322 and a pair of arms 324 extending rearward from the body portion 322. Each of the arms 324 includes an engagement flange 326, and the body portion 322 includes a pair of fingers 328. When the latch mechanism 200 is in its first backset setting, each of the cams 230, 240 is operable to engage each of the flanges 326 to thereby retract the secondary bolt bar 320. More particularly, rotation of either cam 230, 240 in a first direction causes the actuating portion 238, 248 of the cam 230, 240 to engage a first of the flanges 326 for retraction of the bolt bar 320, and rotation of either cam 230, 240 in an opposite second direction causes the actuating portion 238, 248 of the cam 230, 240 to engage a second of the flanges 326 for retraction of the bolt bar 310.

Upon retraction of the secondary bolt bar 320 by either of the cams 230, 240, the fingers 328 of the secondary bolt bar 320 engage the shoulders 318 of the primary bolt bar 310 to thereby retract the primary bolt bar 310. These features define a unidirectional engagement operable to transmit pushing forces without the capability of transmitting pulling forces. As a result, retraction of the secondary bolt bar 320 by a cam 230/240 causes a corresponding retraction of the primary bolt bar 310, while retraction of the primary bolt bar 310 by a cam 230/240 does not cause a corresponding retraction of the secondary bolt bar 320. In certain forms, the secondary bolt bar 320 may remain stationary when latch mechanism 200 is in the second backset setting.

The multiplier 330 is pivotably mounted to the primary bolt bar 310, for example via a rivet 304. The multiplier 330 includes a body portion 332 through which the multiplier 330 is pivotably mounted to the primary bolt bar 310, a first arm 334 operable to engage the bolt 250, and an opposite second arm 336 operable to engage the fulcrum plate 302. In the illustrated form, the first arm 334 extends into a channel 254 formed in the bolt 250, and is operable to retract the bolt 250 by engaging an end wall 255 of the channel 254.

Figure 9:
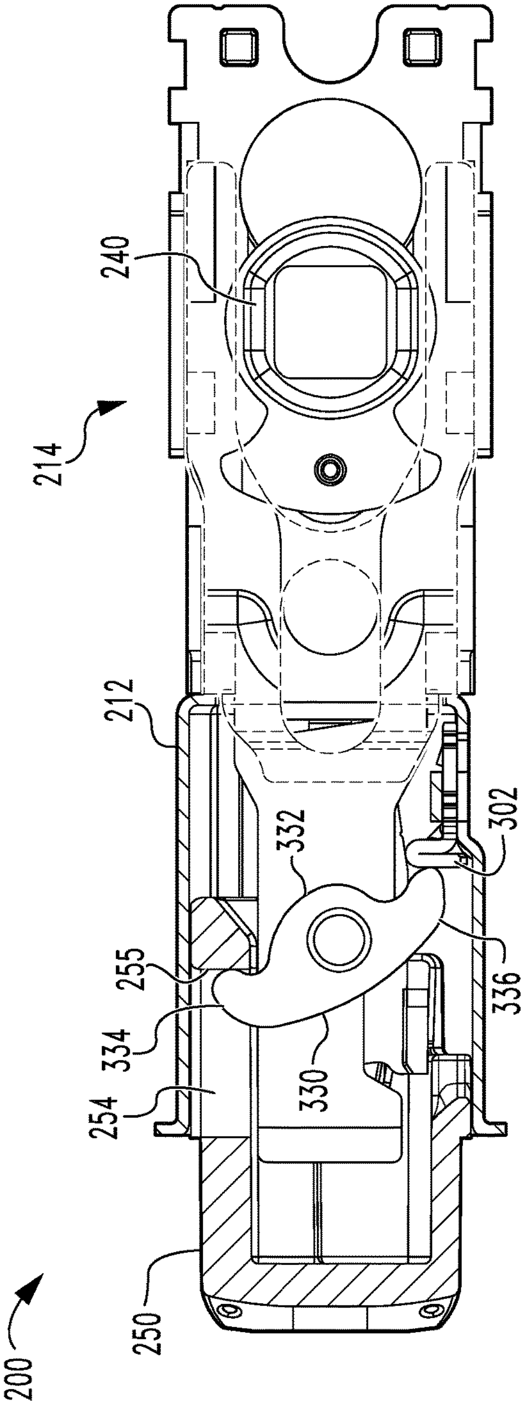
FIG. 9 is a cross-sectional illustration of the latch mechanism in an unactuated state.
Figure 10:
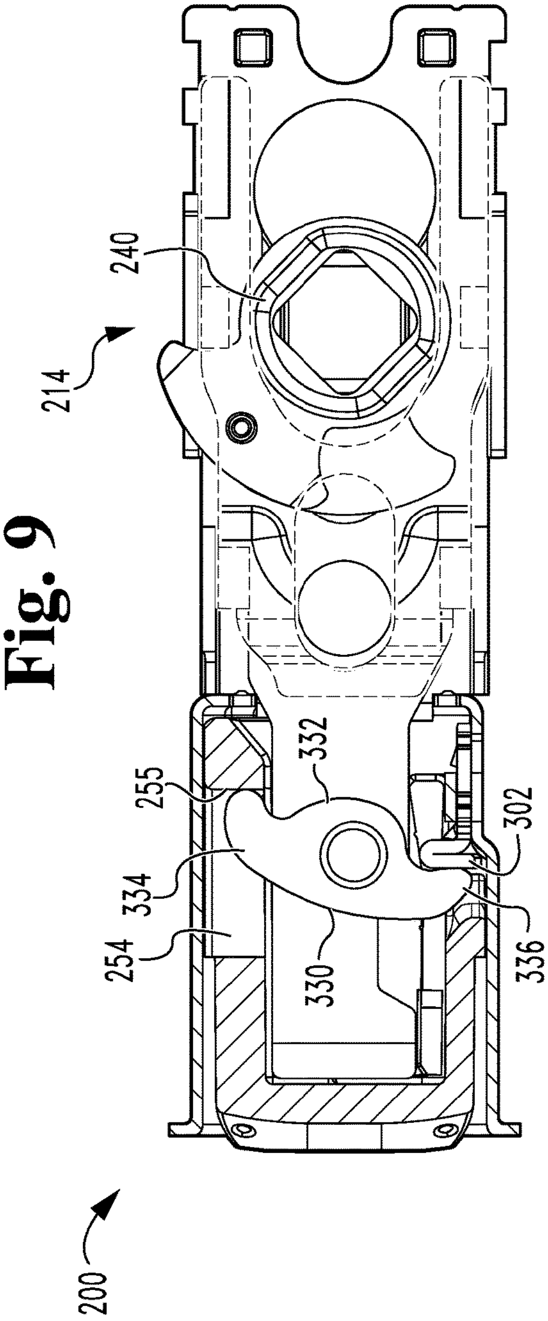
FIG. 10 is a cross-sectional illustration of the latch mechanism in a actuated state.
Figure 11:
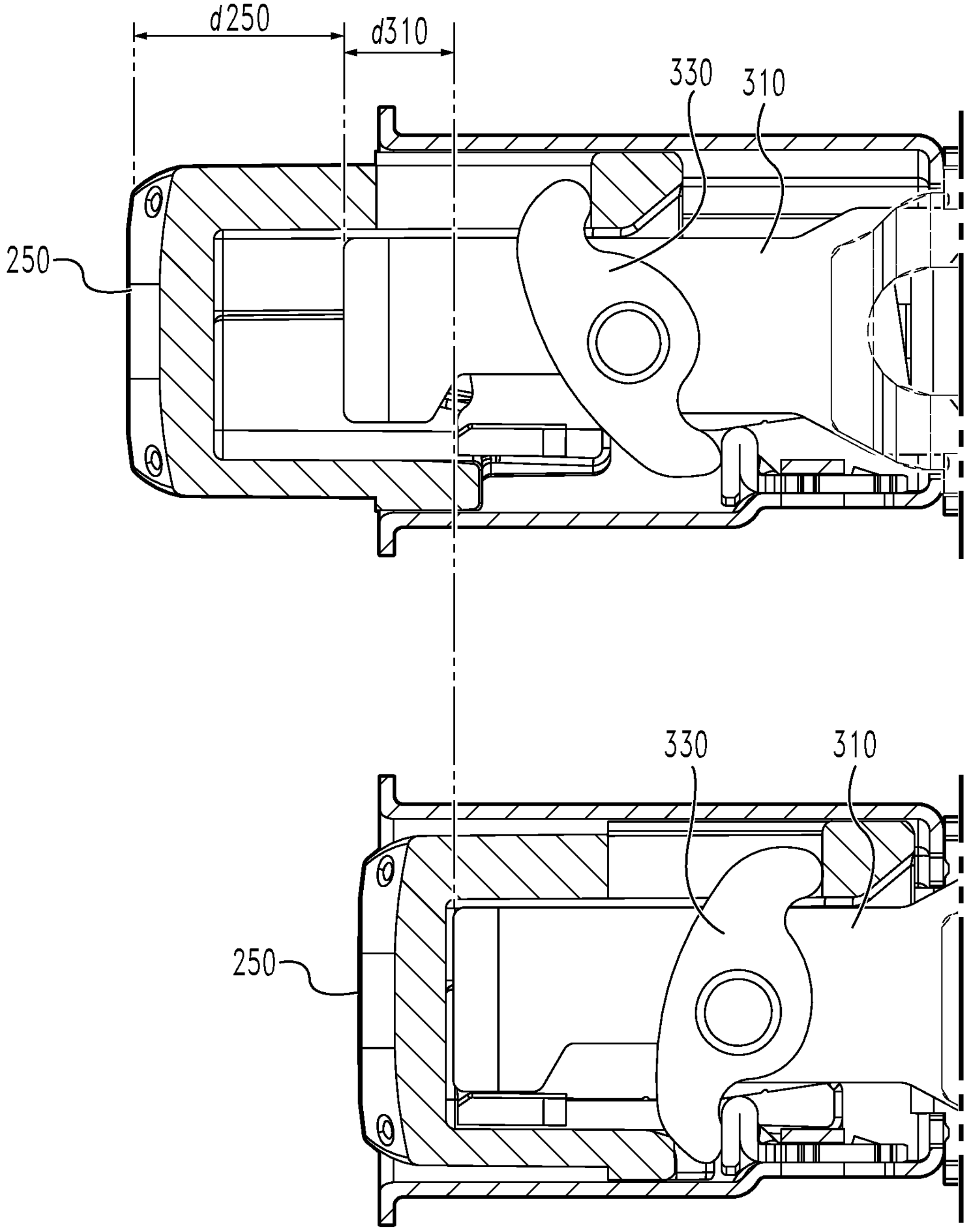
FIG. 11 illustrates displacement distances undergone by certain components of the latch mechanism during an example actuation process.

With additional reference to FIGS. 9 and 10, illustrated therein is the latch mechanism 200 in an unactuated state (FIG. 9) and an actuated state (FIG. 10). With the latch mechanism 200 in the unactuated state (FIG. 9), each of the first cam 230, the second cam 240, the primary bolt bar 310, and the multiplier 330 is in a corresponding and respective home position. Upon rotation of one of the cams 230, 240, the rotating cam 230/240 causes retraction of the primary bolt bar 310 (either directly or indirectly via the second bolt bar 320). This retraction draws the body portion 332 of the multiplier 330 rearward, causing the second arm 336 to engage the fulcrum plate 302, which provides an anchor point or fulcrum for the multiplier 330. As a result, the first arm 334 engages the rear wall 255 of the channel 254 in the bolt 250, thereby driving the bolt 250 rearward. The multiplier 330 thus acts as a class three lever, in which the input force provided by the primary bolt bar 310 is located between the fulcrum of the fulcrum plate 302 and the load of the bolt 250. Accordingly, displacement of the primary bolt bar 310 by a first retraction distance d310 causes a corresponding retraction of the bolt 250 by a second retraction distance d250 greater than the first retraction distance d310, as illustrated in FIG. 11. In certain forms, the full retraction of the bolt 250 may occur in response to rotation of the cam 230/240 through an angle of 45° or less.

Figure 12:
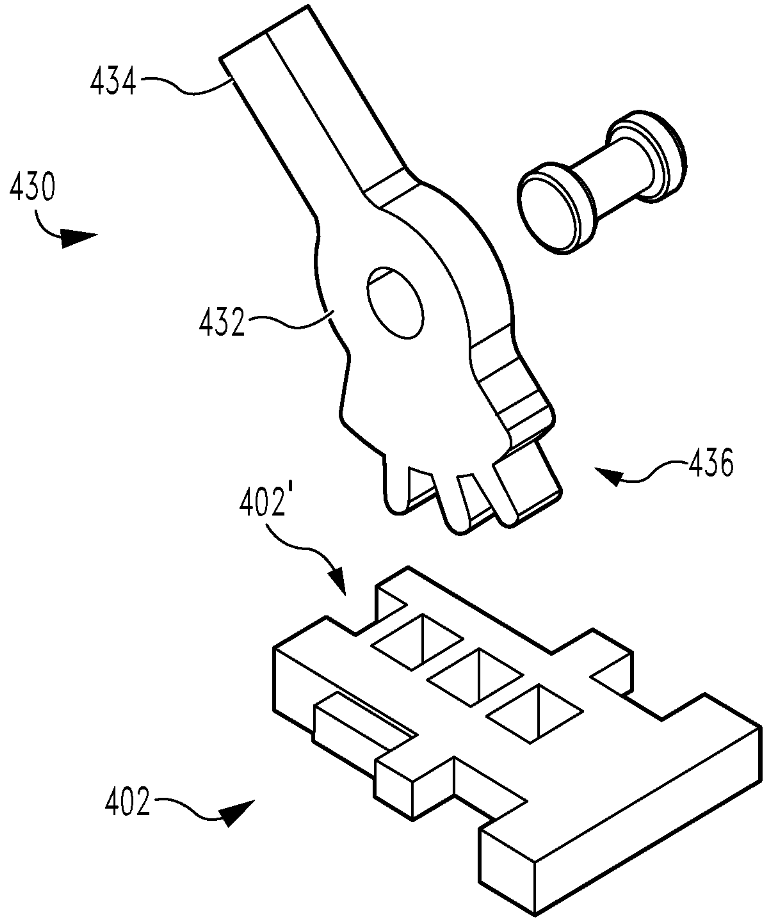
FIG. 12 illustrates a geared multiplier and rack plate according to certain embodiments.

With additional reference to FIG. 12, illustrated therein is an alternative arrangement for the multiplier 330, which is illustrated as a geared multiplier 430. The geared multiplier 430 is substantially similar to the multiplier 330, and is configured to operate in a manner substantially similar to that described above with reference to the multiplier 330. In the interest of conciseness, the following description of the geared multiplier 430 focuses primarily on features that differ from those described above with reference to the multiplier 330.

The geared multiplier 430 is configured for pivotal mounting to the primary bolt bar 310, and generally includes a body portion 432, a first arm 434 operable to engage the bolt 250, and a geared second arm 436 configured to engage a rack 402' of a fulcrum plate 402. Those skilled in the art will readily recognize that the rack and pinion arrangement illustrated in FIG. 12 will result in retraction of the bolt 250 in response to rotation of a cam 230/240 in a manner substantially similar to that described above.

While the invention has been illustrated and described in detail in the drawings and foregoing description, the same is to be considered as illustrative and not restrictive in character, it being understood that only the preferred embodiments have been shown and described and that all changes and modifications that come within the spirit of the inventions are desired to be protected.

It should be understood that while the use of words such as preferable, preferably, preferred or more preferred utilized in the description above indicate that the feature so described may be more desirable, it nonetheless may not be necessary and embodiments lacking the same may be contemplated as within the scope of the invention, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

What is claimed is:

1. A latch mechanism, comprising:
- a housing assembly;
- a bolt slidably mounted in the housing assembly;
- a first cam rotatably mounted in the housing assembly, wherein the first cam is slidable relative to the housing assembly between a first backset position and a second backset position; and
- a retraction assembly configured to retract the bolt in response to rotation of the first cam, wherein the retraction assembly comprises:
  - a primary bolt bar engaged with the bolt such that retraction of the primary bolt bar causes a corresponding retraction of the bolt; and a secondary bolt bar engaged with the primary bolt bar such that retraction of the secondary bolt bar causes a corresponding retraction of the primary bolt bar;

wherein the first cam is operable to engage and retract one of the primary bolt bar or the secondary bolt bar when the first cam is in the first backset position;

wherein the first cam is operable to engage and retract the other of the primary bolt bar or the secondary bolt bar when the first cam is in the second backset position; and wherein the secondary bolt bar is operable to remain stationary during movement of the primary bolt bar when the first cam is in the second backset position.

2. The latch mechanism of claim 1, further comprising a second cam mounted for movement with the first cam between the first backset position and the second backset position;

wherein the second cam is operable to engage and retract the one of the primary bolt bar or the secondary bolt bar when the second cam is in the first backset position; and wherein the second cam is operable to engage and retract the other of the primary bolt bar or the secondary bolt bar when the second cam is in the second backset position.

3. The latch mechanism of claim 1, further comprising a backset adjustment sleeve slidably mounted to the housing for movement between a first position and a second position; and wherein the first cam is rotatably mounted to the backset adjustment sleeve such that shifting of the backset adjustment sleeve between the first position and the second position moves the first cam between the first backset position and the second backset position.

4. The latch mechanism of claim 3, further comprising a second cam; and wherein the second cam is operable to actuate the retraction assembly and is rotatably mounted to the backset adjustment sleeve.

5. The latch mechanism of claim 1, further comprising a cam holder mounted to the housing assembly, the cam holder configured to selectively retain the first cam in each of the first backset position and the second backset position.

6. The latch mechanism of claim 5, wherein the cam holder comprises a pair of arms; and wherein the arms are configured to flex away from one another during movement of the first cam between the first backset position and the second backset position.

7. The latch mechanism of claim 1, wherein the retraction assembly further comprises a multiplier configured to retract the bolt by a first retraction distance in response to retraction of the first bolt bar by a second retraction distance less than the first retraction distance.

8. A latch mechanism, comprising:

a housing assembly;

a bolt bar slidably mounted in the housing assembly;

a cam rotatably mounted for rotation about a rotational axis;

a bolt slidably mounted in the housing assembly; and a multiplier pivotably mounted to the bolt bar for pivotal movement about a pivot axis that moves with the bolt bar, wherein the pivot axis extends in a direction of the rotational axis;

wherein the multiplier is configured to move the bolt by a first displacement distance in response to movement of the bolt bar by a second displacement distance; and wherein the first displacement distance is greater than the second displacement distance.

9. The latch mechanism of claim 8, wherein the housing assembly comprises a fulcrum; and wherein the multiplier comprises a first arm operable to engage the bolt and a second arm operable to engage the fulcrum.

10. The latch mechanism of claim 9, wherein the bolt comprises a channel into which the first arm projects.

11. The latch mechanism of claim 8, wherein the multiplier acts as a class three lever to move the bolt in response to movement of the bolt bar.

12. The latch mechanism of claim 8, wherein the cam is slidable relative to the housing between a first backset position and a second backset position; and wherein the bolt bar is configured to move in response to rotation of the cam.

13. A latch mechanism, comprising:

a housing assembly;

a bolt slidably mounted in the housing assembly;

a first cam rotatably mounted in the housing assembly, wherein the first cam is slidable relative to the housing assembly between a first backset position and a second backset position;

a retraction assembly configured to retract the bolt in response to rotation of the first cam when the first cam is in the first backset position and when the first cam is in the second backset position; and a cam holder mounted to the housing assembly, the cam holder comprising:

a first seat configured to selectively retain the first cam in the first backset position;

a second seat configured to selectively retain the first cam in the second backset position; and a pair of arms at least partially defining the first seat and the second seat, wherein the pair of arms further defines a constriction between the first seat and the second seat;

wherein the arms are operable to flex away from one another to thereby permit travel of the first cam between the first seat and the second seat; and wherein the cam comprises a narrowed section configured to selectively facilitate sliding movement of the cam through the constriction based on a rotational position of the cam.

14. The latch mechanism of claim 13, wherein a dimension of the constriction is less than a diameter of the first cam such that the arms must flex away from one another to permit travel of the first cam between the first seat and the second seat.

15. The latch mechanism of claim 13, further comprising a backset adjustment sleeve slidably mounted to the housing assembly; and wherein the first cam is rotatably mounted to the backset adjustment sleeve such that shifting of the backset adjustment sleeve between a forward position and a rearward position moves the first cam between the first backset position and the second backset position.

16. The latch mechanism of claim 15, further comprising a second cam rotatably mounted to the backset adjustment sleeve; and wherein shifting of the backset adjustment sleeve between the forward position and the rearward position moves the second cam between the first backset position and the second backset position.

17. The latch mechanism of claim 15, wherein the housing assembly comprises a first mounting post aperture and a second mounting post aperture;

wherein the backset adjustment sleeve comprises an additional mounting post aperture;

wherein, with the backset adjustment sleeve in the forward position, the additional mounting post aperture is aligned with the first mounting post aperture; and wherein, with the backset adjustment sleeve in the rearward position, the additional mounting post aperture is aligned with the second mounting post aperture.

18. The latch mechanism of claim 15, wherein the backset adjustment sleeve comprises indicia indicating a direction to drive the backset adjustment sleeve for selection of a desired backset setting.

19. The latch mechanism of claim 13, wherein the housing assembly comprises a stop configured to limit flexing of the arms.

20. The latch mechanism of claim 13, wherein the narrowed section causes variations in an effective diameter of the cam relative to the constriction during rotation of the cam.

21. The latch mechanism of claim 13, wherein the narrowed section comprises a pair of flats that provide the narrowed section with a reduced diameter.

* * * * *